(12) United States Patent
Nakatsugawa et al.

(10) Patent No.: US 8,044,618 B2
(45) Date of Patent: Oct. 25, 2011

(54) CONTROL APPARATUS FOR AC MOTOR

(75) Inventors: Junnosuke Nakatsugawa, Hitachi (JP);
Yoshitaka Iwaji, Hitachinaka (JP);
Kazuaki Tobari, Hitachiota (JP);
Kiyoshi Sakamoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 515 days.

(21) Appl. No.: 12/277,476

(22) Filed: Nov. 25, 2008

(65) Prior Publication Data
US 2009/0140674 A1 Jun. 4, 2009

(30) Foreign Application Priority Data
Nov. 30, 2007 (JP) .................. 2007-309635

(51) Int. Cl.
*H02P 21/00* (2006.01)
(52) U.S. Cl. ................ 318/400.02; 318/811; 318/801
(58) Field of Classification Search ........... 318/400.02, 318/798, 800, 801, 459, 500, 811, 599
See application file for complete search history.

(56) References Cited

U.S. PATENT DOCUMENTS

| 5,003,243 | A | * | 3/1991 | Tadakuma et al. ............ 318/800 |
| 5,463,301 | A | * | 10/1995 | Kim .............................. 318/801 |
| 5,699,240 | A | * | 12/1997 | Obayashi ....................... 363/98 |
| 2007/0296364 | A1 | * | 12/2007 | Shoemaker et al. .......... 318/561 |

FOREIGN PATENT DOCUMENTS

| JP | 08-19263 | 1/1996 |
| JP | 09-327200 | 12/1997 |
| JP | 2001-161099 | 6/2001 |
| JP | 2001-251889 | 9/2001 |
| JP | 2004-48868 | 2/2004 |
| JP | 2004-297966 | 10/2004 |
| JP | 2008-86129 | 4/2008 |

* cited by examiner

*Primary Examiner* — Rina Duda
(74) *Attorney, Agent, or Firm* — Antonelli, Terry, Stout & Kraus, LLP.

(57) ABSTRACT

It is attained by being provided with a motor constant calculation unit for calculating electric constants of a motor, and by correcting setting values of electric constants defined on one of the axes of two orthogonal axes, by a functional expression using a state variable defined on the same axis, and by correcting them by a functional expression using a state variable defined on the other axis.

14 Claims, 10 Drawing Sheets

CONTROL APPARATUS FOR AC MOTOR

BACKGROUND OF THE INVENTION

The present invention relates to a control apparatus for an AC motor, in particular, the present invention relates to setting of electric constants of an AC motor.

An AC motor, in particular, a permanent magnet synchronous motor has been extending the application ranges such as consumer electronics, industry, automobiles, by utilization of features of a compact size and high efficiency. In particular, in recent years, products having a motor drive system replaced from a square wave energization type to a sinusoidal wave energization type, and there has increased a controller essentially requiring input of electric constants setting values of a motor, such as resistance, inductance and back EMF (electromotive force) constant, in applications such as rotator position estimation by position sensorless control, or high precision torque control. Therefore, input without correct identification of electric constants of a motor influences on control performance very much. Among others, inductance is strongly influenced by magnetic nonlinearity of a core, and influence of magnetic saturation is expressed very much.

Technology for varying electric constants setting values of an AC motor, in response to electric current, has been shown in JP-A-2001-161099. This technology is a technology for improving torque precision by furnishing the relation between magnetic flux and electric current of a synchronous motor, as a nonlinear function, to the inside of a controller. Further, JP-A-9-327200 has shown a technology for configuring a control apparatus, in consideration of cross-magnetization effect of an armature d-axis and an armature q-axis, and magnetic field system and an armature q-axis (hereafter referred to as conventional technology 2).

SUMMARY OF THE INVENTION

JP-A-2001-161099 has referred to the presence of inter-axial cross-magnetization such as generation of q-axis magnetic flux by d-axis electric current, and this relation is called a nonlinear magnetic flux function. However, there is no specific description on this function, and a method for using table data has been shown.

JP-A-9-327200 has also defined the mutual inductance between a d-axis and a q-axis, in consideration of cross-magnetization effect of the d-axis and the q-axis. However, similarly as in JP-A-2001-161099, there is no specific description on this function, and a method for using table data has been shown.

In the case of using the table data, a large number of data are required in the setting, which makes data input cumbersome and requires a large memory for memorizing them. In addition, it generates necessity of interpolation between non-continuous data.

The present invention has been proposed in consideration of the above points, and it is an object of the present invention to provide a control apparatus of an AC motor, by simply and conveniently setting electric constants of an AC motor, which vary in response to a driving state of a motor, to enable use thereof in motor control.

The present invention is characterized in that, in a control apparatus for an AC motor having: an inverter for applying pulse width modulated voltage to an AC motor, and for driving the AC motor; a unit for detecting electric current of the AC motor; and a controller for adjusting pulse width modulated voltage, which the inverter outputs, and for driving the AC motor; the controller is provided with a motor constant calculation unit for calculating electric constants of a motor, and the motor constant calculation unit corrects setting values of electric constants defined on one of the axes of two orthogonal axes, by using a state variable defined on the same axis, and corrects them by using a state variable defined on the other axis, and uses the corrected electric constants for driving control of the AC motor.

In addition, it is characterized by using inductances, back EMF constants or electric current as the electric constants.

Further, it is characterized in that, when the electric constants setting values are used as d-axis inductance Ld, and the Ld corrected by using d-axis electric current Id is used as Ld(Id), the motor constant calculation unit executes correction of Ld by q-axis electric current Iq, by using the (equation 1), wherein K is a constant:

$$Ld(Id, Iq) = Ld(Id) - K \times Iq \times Iq \quad \text{(Equation 1)}$$

In addition, it is characterized in that the motor constant calculation unit executes correction of Lq by d-axis electric current Id, by using the (equation 2), wherein K is a constant:

$$Lq(Id, Iq) = Lq(Iq) - K \times Id \quad \text{(Equation 2)}$$

In addition, it is characterized in that, when the electric constants setting values are used as back EMF constant Ke, and the back EMF constant at electric current with nearly zero is used as $\phi m0$, correction of Ke by q-axis electric current Iq is executed by using the (equation 3), wherein K is a constant:

$$Ke(Iq) = \phi m0 - K \times Iq \times Iq \quad \text{(Equation 3)}$$

According to the present invention, electric constants of an AC motor can be set more correctly and more simply and conveniently. As a result, by using such correct electric constants in torque control, more highly precise torque control becomes possible, even under high load, and a motor can be driven in high response and in high efficiency.

In addition, by using such correct electric constants in position sensorless control, more correct estimation of rotor position becomes possible, and control performance of position sensorless control is enhanced.

As described above, by enhancement of control characteristics under high load, compact sizing and low cost of an AC motor, as a controlled object, can be attained.

Other objects, features and advantages of the invention will become apparent from the following description of the embodiments of the invention taken into conjunction with the accompanying drawings.

DESCRIPTION OF THE EMBODIMENTS

Next, explanation will be given on embodiments of a control apparatus of an AC motor according to the present invention, with reference to FIG. 1 to FIG. 7. It should be noted that explanation will be given, in embodiments below, on a permanent magnet synchronous motor (hereafter abbreviated as a PM motor) as an AC motor, however, similar embodiments can be attained also as for other motors (for example, a wire-wound synchronous motor, a reluctance motor, an induction motor and the like).

Embodiment 1

Figure 1:
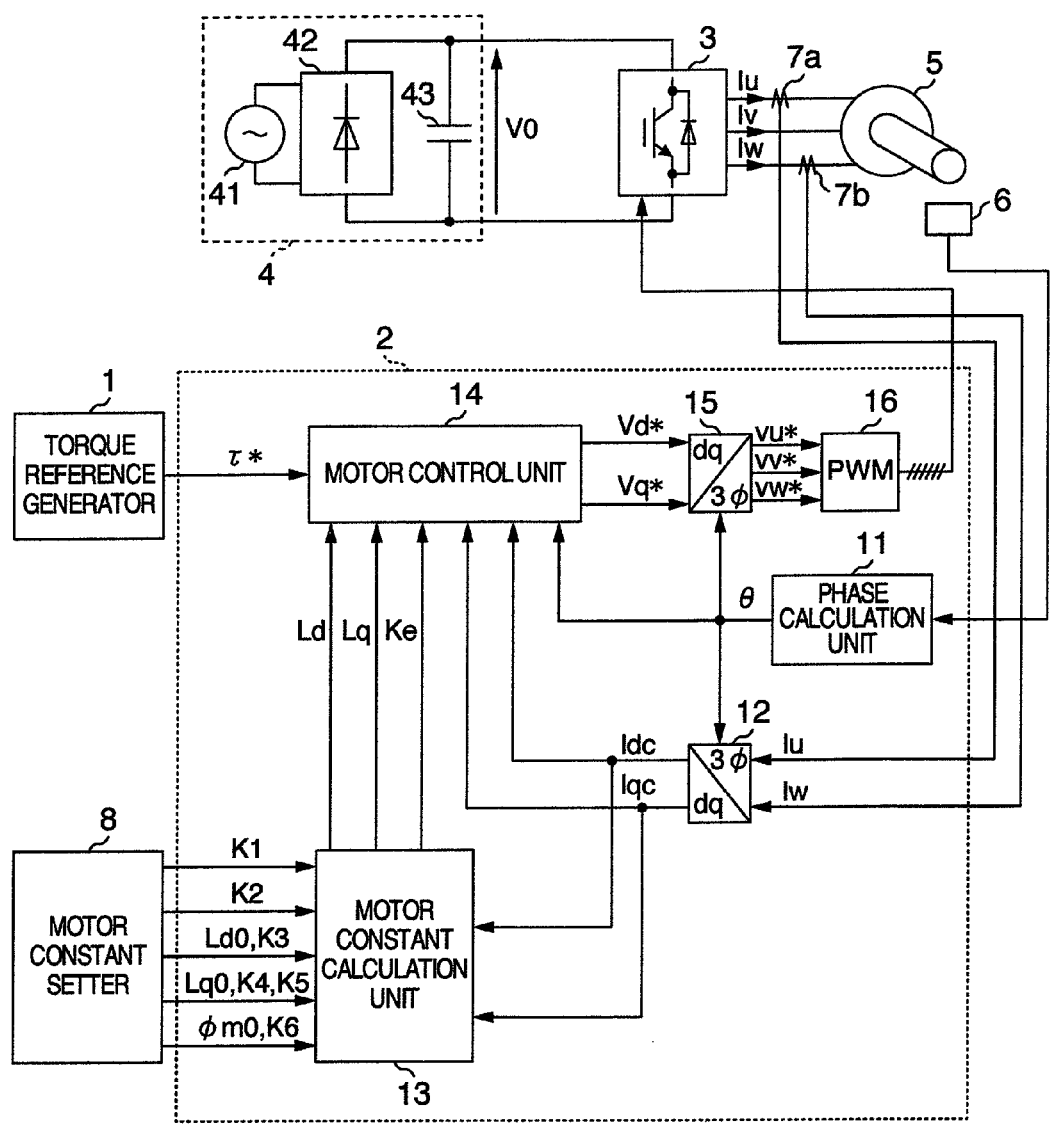
FIG. 1 is a block diagram showing a system configuration of embodiment 1 of the present invention.

FIG. 1 is a block diagram showing a system configuration of embodiment 1 of a control apparatus of an AC motor according to the present invention. A control apparatus of the present embodiment 1 is configured by a torque reference generator 1 for giving torque reference τ* to a motor, a controller 2 for calculating AC applied voltage of a motor and for outputting it by converting to a pulse width modulated signal (hereafter abbreviated as a PWM signal), an inverter 3 driven by this PWM signal, a DC power source 4 for supplying power to the inverter 3, a permanent magnet type synchronous motor 5 (hereafter abbreviated as a PM motor) as a controlled object, a position detector 6 for detecting position of a rotor of the PM motor 5, an electric current detector 7a for detecting electric current Iu supplied to the PM motor by the inverter 3, an electric current detector 7b for detecting electric current Iw, and a motor constant setter 8 for setting constants K1, K2, K3, K4, K5, K6, Ld0, Lq0 and φm0 for calculating electric constants of a motor.

The controller 2 is configured by a phase calculation unit 11 for calculating phase angle θ of the rotor from position of permanent magnet magnetic flux of the PM motor 5 detected by the position detector 6, a dq coordinate conversion unit 12 for coordinate-converting the detected electric currents Iu and Iw, by a phase angle θ, to components Idc and Iqc on each of d and q axes, a motor constant calculation unit 13 for calculating and outputting the electric constants Ld, Lq and Ke of the PM motor 5, based on output of the motor constant setter 8 and electric current detected values Idc and Iqc, a motor control unit 14 for calculating voltage references Vd* and Vq* for driving the PM motor 5, based on the torque reference τ*, the electric constants Ld, Lq and Ke of the PM motor, the electric current detected values Idc and Iqc, and the phase angle θ, a dq coordinate reversed conversion unit 15 for converting Vd* and Vq* to three-phase AC voltage references vu*, vv* and vw* by the phase angle θ, and a PWM signal generation unit 16 for generating the PWM signal for switching operation of the inverter 3, based on the three-phase AC voltage references.

The DC power source 4 supplying the power to the inverter 3 is configured by an AC power source 41, a diode bridge 42 for rectifying AC, and a smoothing capacitor 43 for suppressing pulsating components contained in the DC power source.

Next, explanation will be given on operation principle of the present embodiment 1 with reference to FIG. 1.

The torque reference τ* of a motor is given to the motor control unit 14 from the torque reference generator 1, by digital, analogue or other communication means. In addition, the AC currents Iu and Iw detected by the electric current detectors 7a and 7b are converted to electric current components Idc and Iqc on a rotation coordinate axes (d and q axes) in the dq coordinate conversion unit 12, by the phase angle θ calculated at the phase calculation unit 11.

The constants K1, K2, K3, K4, K5, K6, Ld0, Lq0 and φm0, output from the motor constant setter 8, and the detected electric currents Idc and Iqc are input to the motor constant calculation unit 13, and the electric constants Ld, Lq and Ke of the PM motor are calculated in response to electric current value, and sent to the motor control unit 14.

Figure 2:
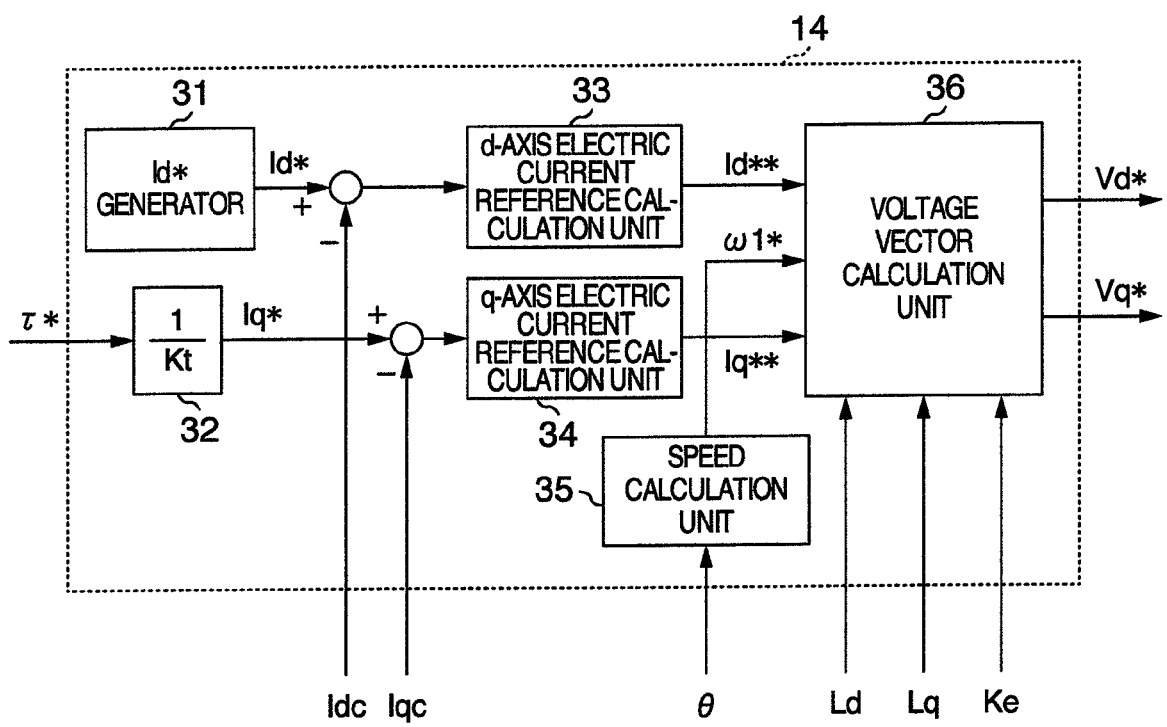
FIG. 2 is a block diagram showing an inside configuration of a motor constant calculation unit in embodiment 1 of the present invention.

Configuration of the motor control unit 14 is shown in FIG. 2. Configuration of the motor control unit 14 shown in the present embodiment is nearly the same as that shown in FIG. 3 of JP-A-2004-297966, and a different point is that the electric constants Ld, Lq and Ke of the PM motor, which are output by the motor constant calculation unit 13, are input to a voltage vector calculation unit 36, and the voltage reference values Vd* and Vq* are calculated by the following equations.

$$Vd^* = R \times Id^{**} - \omega 1^* \times Lq \times Iq^{**}$$

$$Vq^* = R \times Iq^{**} + \omega 1^* \times Ld \times Id^{**} + \omega 1^* \times Ke \quad \text{(Equation 4)}$$

And the Vd* and Vq* are converted to alternating quantity in the dq coordinate reversed conversion unit 15 by the phase angle θ, and still more converted to the pulse width modulated signal in the PWM signal generation unit 16, and sent to the inverter 3.

Next, explanation will be given in detail on operation of the motor constant calculation unit 13, which is characteristics of the present invention, with reference to FIG. 3.

(Explanation on Configuration)

Figure 3:
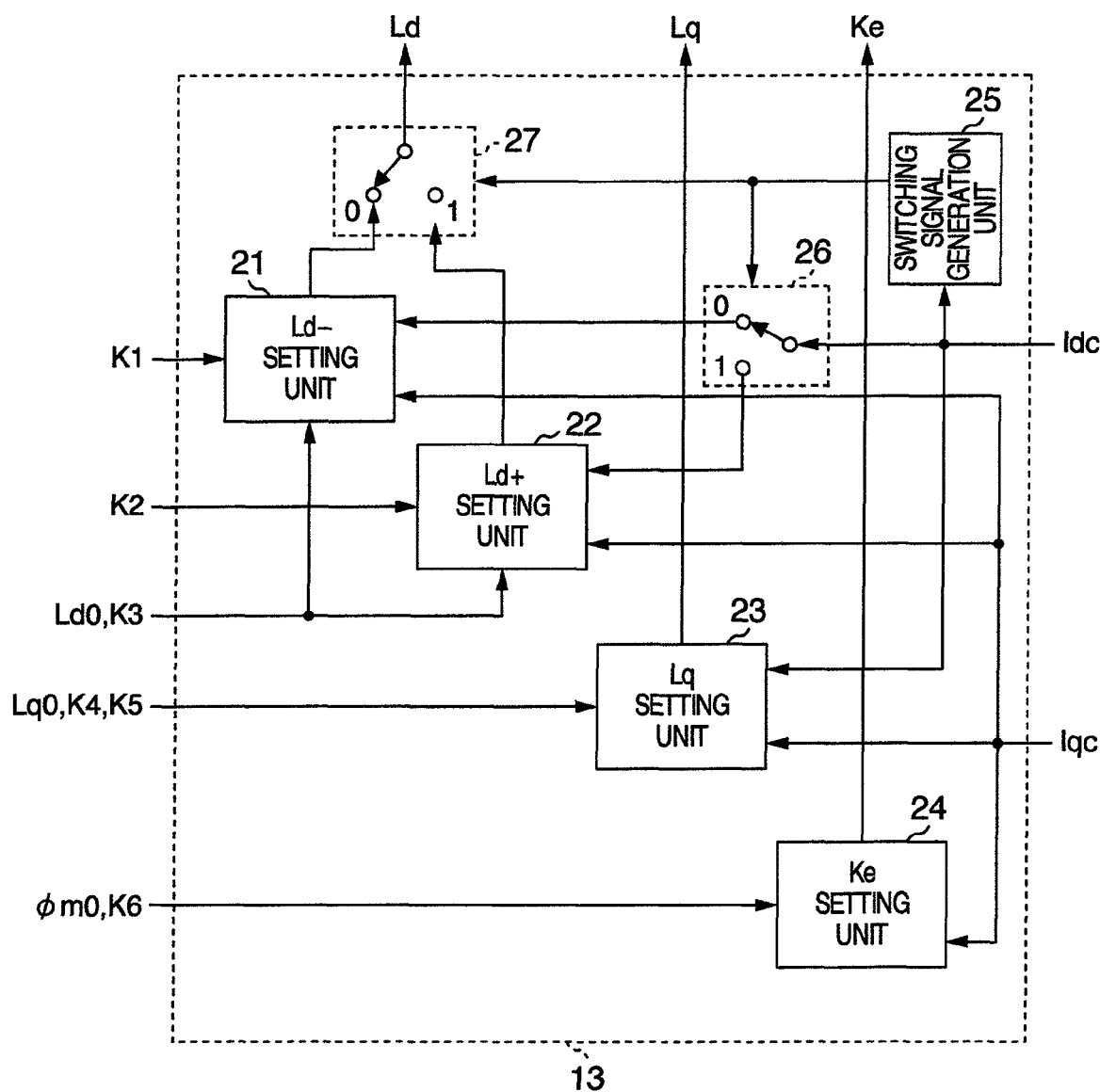
FIG. 3 is a block diagram showing an internal configuration of a motor control unit in embodiment 1 of the present invention.

As shown in FIG. 3, the motor constant calculation unit 13 is configured by an Ld− setting unit 21, an Ld+ setting unit 22, an Lq setting unit 23, a Ke setting unit 24, an switching signal generation unit 25, a first switching unit 26 and a second switching unit 27.

The constants Ld0, K1 and K3 for calculating electric constants of a motor are input to the Ld−setting unit 21, and Ld0, K2 and K3 are input to the Ld+ setting unit 22, and Lq0, K4 and K5 are input to the Lq setting unit 23, and φm0 and K6 are input to the Ke setting unit 24.

The detected current Idc is input to the switching signal generation unit 25, and in the case where the Idc is negative, the first switching unit 26 is switched to "0" side. As a result, the detected currents Idc and Iqc are input to the Ld− setting unit 21 and the Ld in response to electric current is calculated and output. In this case, the second switching unit 27 is also switched to "0" side, and the Ld output from the Ld−setting unit 21 is selected. On the other hand, in the case where the Idc is positive, the first switching unit 26 is switched to "1" side. As a result, the detected currents Idc and Iqc are input to the Ld+ setting unit 22, and the Ld in response to electric current is calculated and output. In this case, the second switching unit 27 is also switched to "1" side, and the Ld output from the Ld+ setting unit 22 is selected.

The detected currents Idc and Iqc are input to the Lq setting unit 23, and the Lq in response to electric current is calculated and output. The detected current Iqc is input to the Ke setting unit 24, and the Ke in response to electric current is calculated and output.

(Explanation on Actuation)

In the Ld−setting unit 21, Ld setting value is varied by the following function expression etc., characterizing the influence of Idc on Ld, from input constants Ld0, K1 and detected electric current Idc, using d-axis electric current Idc as a parameter.

$$Ld(Idc)=Ld0/(1-K1 \times Idc) \quad \text{(Equation 5)}$$

where Ld0 is used as Ld setting value at the vicinity of 0 electric current.

Further, in the Ld−setting unit 21, Ld setting value is varied by the following function expression etc., characterizing the influence of Iqc on Ld, from input constant K3 and detected electric current Iqc, using q-axis electric current Iqc as a parameter.

$$Ld(Idc,Iqc)=Ld(Idc)-K3 \times Iqc \times Iqc \quad \text{(Equation 6)}$$

In the Ld+ setting unit 22, Ld setting value is varied by the following function expression eyc., characterizing the influence of Idc on Ld, from input constants Ld0, K2 and detected electric current Idc, using d-axis electric current Idc as a parameter.

$$Ld(Idc)=Ld0/(1+K2 \times Idc) \quad \text{(Equation 7)}$$

Still more, in the Ld+ setting unit 22, Ld setting value is varied by the following function expression etc., characterizing the influence of Iqc on Ld, from input constant K3 and detected electric current Iqc, using q-axis electric current Iqc as a parameter.

$$Ld(Idc,Iqc)=Ld(Idc)-K3 \times Iqc \times Iqc \quad \text{(Equation 8)}$$

In the Lq setting unit 23, Ld setting value is varied by the following function expression etc., characterizing the influence of Iqc on Ld, from input constants Lq0, K4 and detected electric current Iqc, using q-axis electric current Iqc as a parameter.

$$Lq(Iqc)=Lq0/(1+K4 \times Iqc) \quad \text{(Equation 9)}$$

Wherein, Lq0 is used as Lq setting value at the vicinity of 0 electric current.

Still more, in the Lq setting unit 23, Ld setting value is varied by the following function expression etc., characterizing the influence of Idc on Lq, from input constant K5, and detected electric current Idc, using d-axis electric current Idc as a parameter.

$$Lq(Idc,Iqc)=Lq(Iqc)-K5 \times Idc \quad \text{(Equation 10)}$$

In the Ke setting unit 24, Ke setting value is varied by the following function expression etc., characterizing the influence of Iqc on Ke, from input constants $\phi$m0, K5 and detected electric current Iqc, using q-axis electric current Iqc as a parameter.

$$Ke(Iqc)=(\phi m0-K6 \times Iqc \times Iqc) \quad \text{(Equation 11)}$$

Wherein, $\phi$m0 is used as coil interlinkage magnetic flux by a permanent magnet at 0 electric current.

(Explanation on Effect)

Relation between d and q axes magnetic fluxes $\phi$d and $\phi$q, and the d and q axes electric currents Id and Iq, in the case where the electric constants Ld, Lq and Ke of a motor are set as fixed constants, is shown below:

$$\begin{bmatrix} \phi_d \\ \phi_q \end{bmatrix} = \begin{bmatrix} L_d & 0 \\ 0 & L_q \end{bmatrix} \begin{bmatrix} I_d \\ I_q \end{bmatrix} + \begin{bmatrix} K_e \\ 0 \end{bmatrix} \quad \text{(Equation 12)}$$

As described above, in the case where the electric constants of a motor are set as fixed constants, magnetic flux and electric current are expressed as a linear proportional relation. Practically, with increase in electric current of a motor, caused by high load etc., the relation between magnetic flux and electric current becomes nonlinear caused by magnetic saturation, however, this tendency cannot be expressed well by the above equation.

On the other hand, in the case where the electric constants Ld and Lq of a motor are shown by an approximate expression, in consideration of influence of Id on Ld, and influence of Iq on Lq, as described above, relation between magnetic flux and electric current is given as follows:

$$\begin{bmatrix} \phi_d \\ \phi_q \end{bmatrix} = \begin{bmatrix} L_d(I_d) & 0 \\ 0 & L_q(I_q) \end{bmatrix} \begin{bmatrix} I_d \\ I_q \end{bmatrix} + \begin{bmatrix} K_e \\ 0 \end{bmatrix} \quad \text{(Equation 13)}$$

Figure 4:
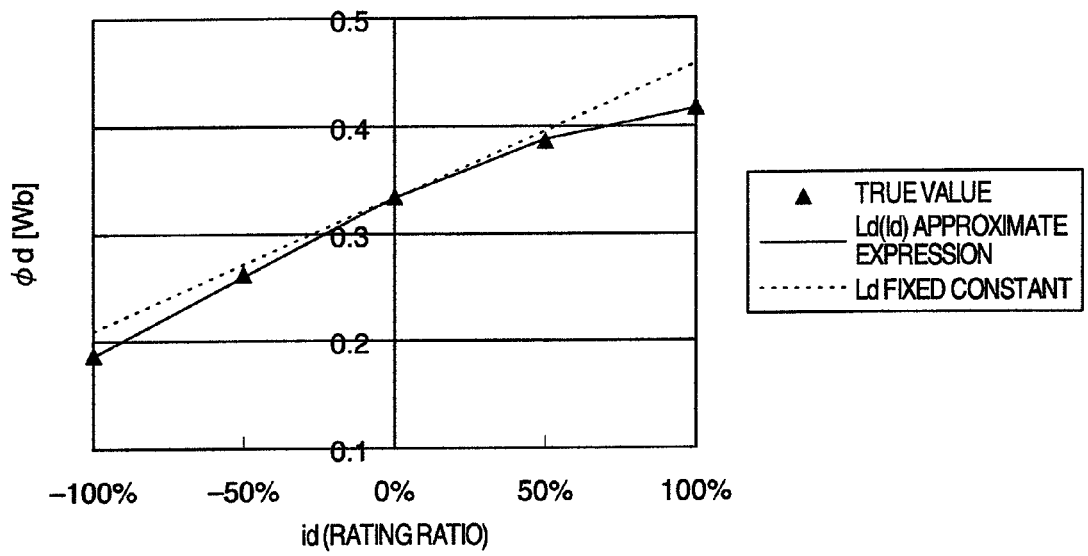
FIG. 4 is a correlation drawing between d-axis magnetic flux and d-axis electric current in embodiment 1 of the present invention.

By taking a certain motor as an example, for the case of calculating magnetic flux $\phi$d, with Ld as a fixed constant and Id as a horizontal axis, and for the case of calculating it by an Ld(Id) approximate expression, that is, in consideration of influence of Id on Ld, comparisons with true value are shown in FIG. 4. Similarly, for the case of calculating magnetic flux $\phi$q, with Lq as a fixed constant, and for the case of calculating it by an Lq(Iq) approximate expression, that is, in consideration of influence of Iq on Lq, comparisons with true value are shown in FIG. 5.

Figure 5:
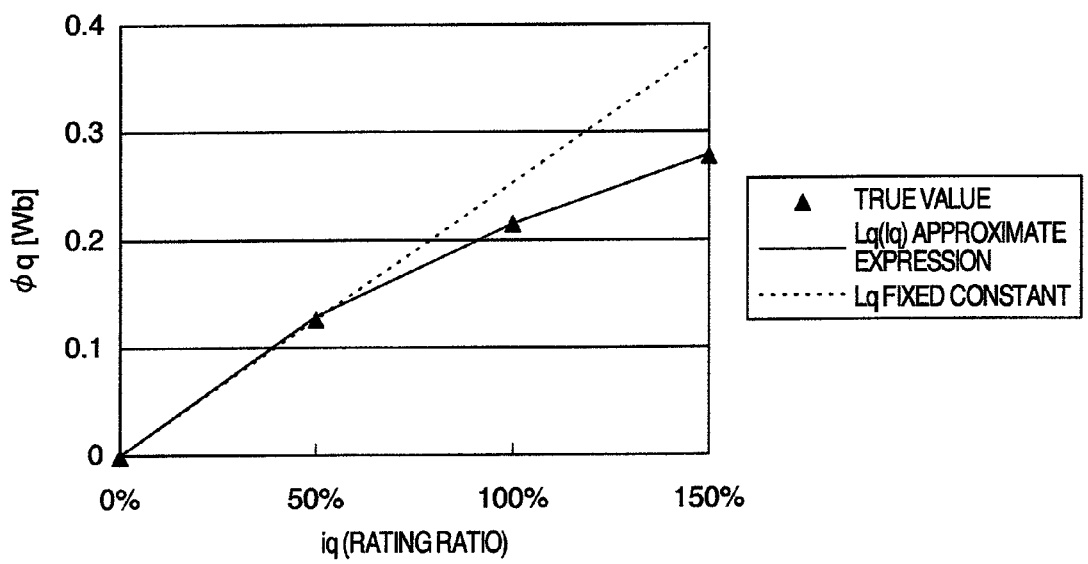
FIG. 5 is a correlation drawing between q-axis magnetic flux and q-axis electric current in embodiment 1 of the present invention.

From FIG. 4 and FIG. 5, it is observed that in the case of using Ld and Lq as fixed constants, magnetic flux and electric current show a linear proportional relation, deviating from true value, however, in the case of using Ld(Id) approximate expression and Lq(Iq) approximate expression, a nonlinear relation of magnetic flux and electric current can be well approximated.

However, only by the above approximation, cross-magnetization effect between d and q axes is not considered. In the case where a motor is driven under high load, because of large influence of the cross-magnetization effect between d and q axes, it is desired to set electric constants of a motor by taking the effect into consideration.

Accordingly, relation between magnetic flux and electric current is defined as follows, by using electric constants Ld, Lq and Ke of a motor, as an approximate expression, in consideration of also influence of Iq on Ld, influence of Id on Lq, and influence of Iq on Ke, as described above:

$$\begin{bmatrix} \phi_d \\ \phi_q \end{bmatrix} = \begin{bmatrix} L_d(I_d, I_q) & 0 \\ 0 & L_q(I_d, I_q) \end{bmatrix} \begin{bmatrix} I_d \\ I_q \end{bmatrix} + \begin{bmatrix} K_e(I_q) \\ 0 \end{bmatrix} \quad \text{(Equation 14)}$$

Figure 6:
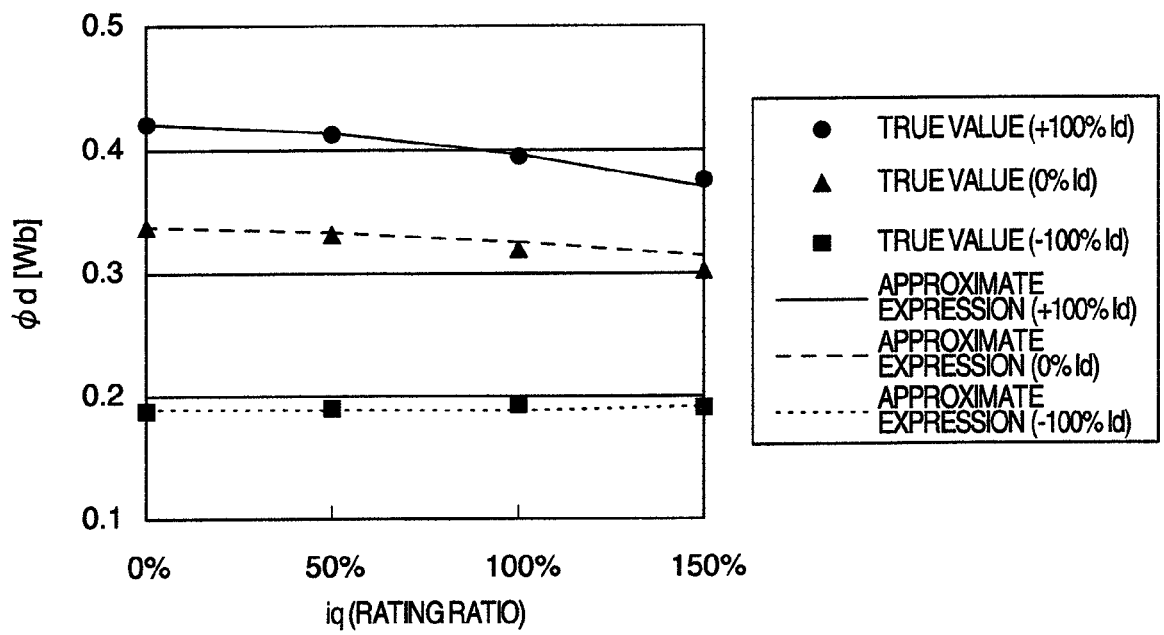
FIG. 6 is a correlation drawing between d-axis magnetic flux and q-axis electric current in embodiment 1 of the present invention.

For the case of calculating magnetic flux $\phi$d by the above approximate expression, with Id changed to 100%, 0% and −100% of rating ratio, and Iq as a horizontal axis, comparison with true values is shown in FIG. 6. Similarly, for the case of calculating magnetic flux $\phi$q by the above approximate expression, with Iq changed to 50%, 100% and 150% of rating ratio, and Id as a horizontal axis, comparison with true values is shown in FIG. 7.

Figure 7:
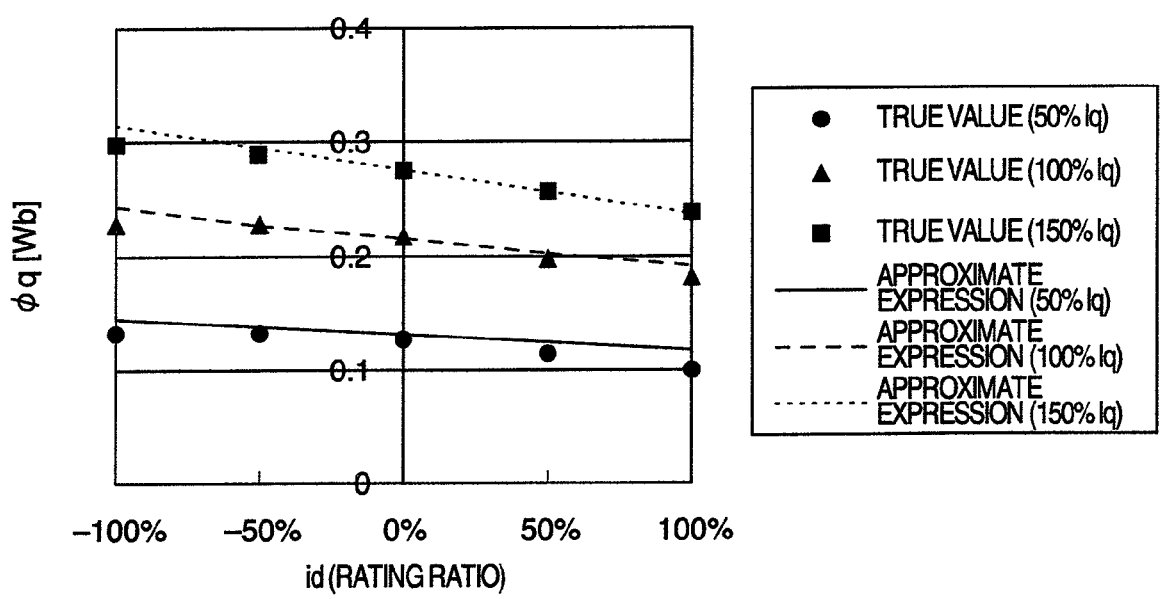
FIG. 7 is a correlation drawing between q-axis magnetic flux and d-axis electric current in embodiment 1 of the present invention.

From FIG. 6 and FIG. 7, it is observed that according to the present invention, by consideration of influence of Id and Iq on Ld, influence of Id and Iq on Lq, and influence of Iq on Ke, influence of Id and Iq on d-axis magnetic flux φd and on q-axis magnetic flux φq can be well approximated.

As described above, based on the present invention, by setting electric constants of a motor by a simple and convenient function expression in consideration of cross-magnetization effect between d and q axes, magnetic flux characteristics, in the case of driving a motor under load, can be reproduced correctly and simply and conveniently.

By using electric constants Ld, Lq and Ke of the PM motor, which are output by the motor constant calculation unit 13, in calculation of voltage reference value, as described above, which is features of the present invention, highly precise torque control and high response can be attained, even when electric constants of a motor vary with increase in motor electric current caused by high load or the like.

Embodiment 2

Figure 8:
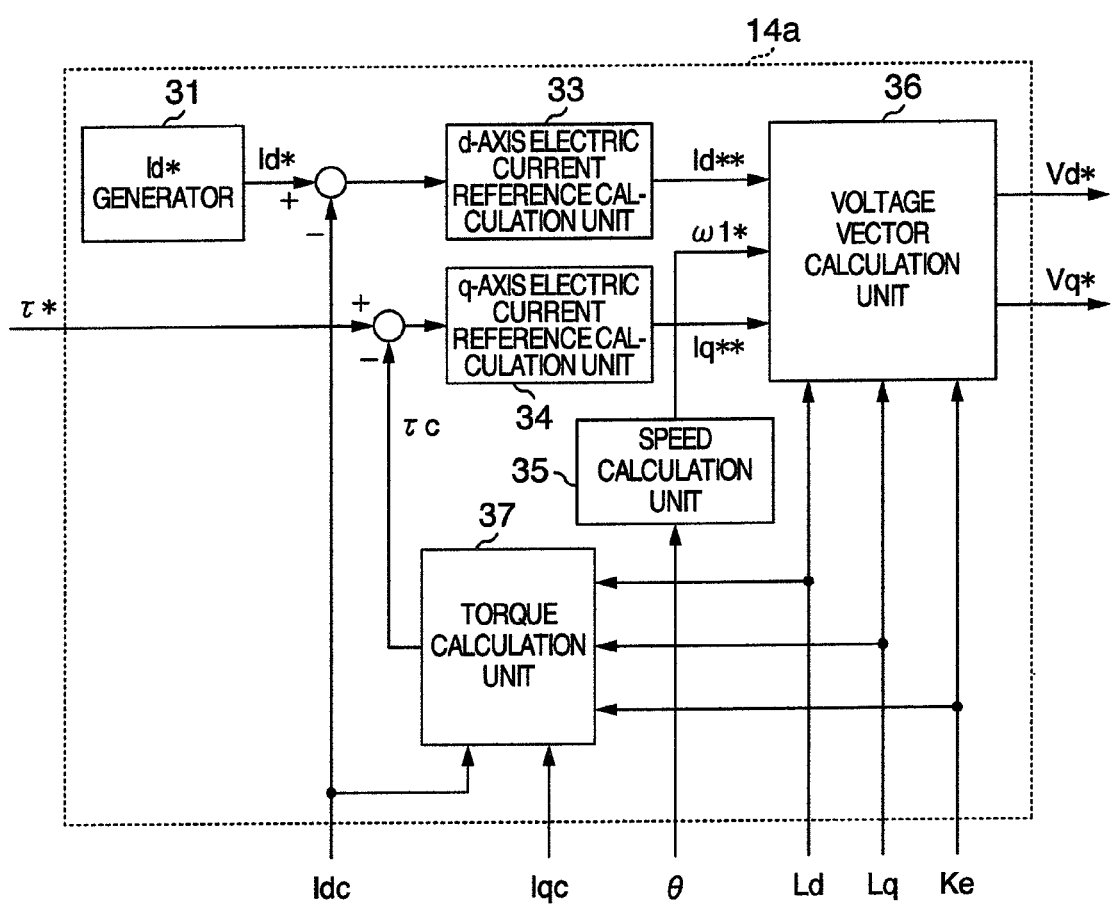
FIG. 8 is a block diagram showing an internal configuration of a motor control unit in embodiment 2 of the present invention.

In embodiment 2, the motor control unit 14 is substituted with a motor control unit 14a shown in FIG. 8. Different points of FIG. 8 from FIG. 2 are absence of conversion coefficient 32, and calculation of a torque estimation value τc by being provided with a torque calculation unit 37.

The electric constants Ld, Lq and Ke of the PM motor, which are output by the motor constant calculation unit 13, and detected currents Idc and Iqc are input to the torque calculation unit 37, and the torque estimation value τc is calculated by the following function expression.

$$\tau c = Ke \times Iqc + (Ld - Lq) \times Idc \times Iqc \quad \text{(Equation 15)}$$

By using electric constants Ld, Lq and Ke of the PM motor, which are output by the motor constant calculation unit 13, in torque estimation calculation, as described above, which is features of the present invention, highly precise torque control and high response can be attained, even when electric constants of a motor vary with increase in motor electric current caused by high load or the like.

Embodiment 3

In embodiment 1 and embodiment 2, explanations were given on configuration of the case having both a position sensor and an electric current sensor, however, configuration of the case having a position sensorless and an electric current sensor is also attainable. Explanation will be given with reference to FIG. 9.

Different points of FIG. 9 from FIG. 1 are as follows. Firstly, the torque reference generator 1 is substituted with a speed reference generator 1a, the motor control unit 14 is substituted with a motor control unit 14b, and still more the position detector 6 and the phase calculation unit 11 are eliminated, and phase angle θdc is supplied from the motor control unit 14b.

As for a setting method for the electric constants, a method explained in embodiment 1 is used.

Figure 10:
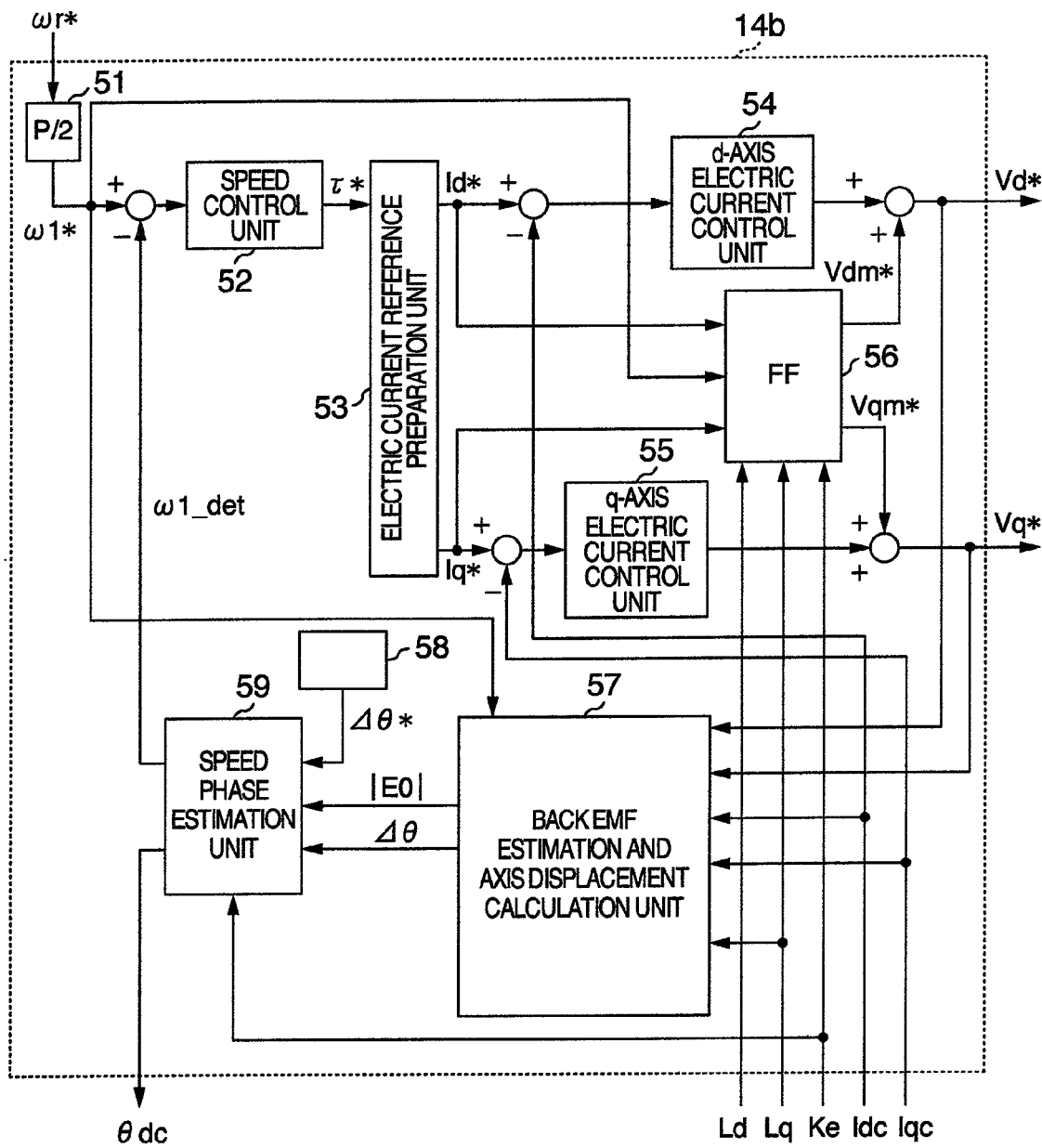
FIG. 10 is a block diagram showing an internal configuration of a motor control unit in embodiment 3 of the present invention.

Next, explanation will be given in detail on actuation of the motor control unit 14b with reference to FIG. 10.

Configuration of the motor control unit 14b shown in the present embodiment is nearly the same as that of FIG. 1 of JP-A-2001-251889, and different points are that the electric constants of the PM motor, which are output by the motor constant calculation unit 13, are input to an electric current feed-forward compensation unit 56, an back EMF estimation and axis displacement calculation unit 57 and a speed phase estimation unit 59, to be used in calculation of Vdm*, Vqm*, Δθ and ω1_det.

In the electric current feed-forward compensation unit 56, d-axis model voltage Vdm* and q-axis model voltage Vqm* are calculated, by the following function expression, from motor resistance setting value R, the electric constants Ld, Lq and Ke of the PM motor, which are output by the motor constant calculation unit 13, speed reference ω1*, electric current references Id* and Iq* and voltage references Vd* and Vq*.

$$Vdm^* = R \times Id^* - \omega 1^* \times Lq \times Iq^*$$

$$Vqm^* = R \times Iq^* + \omega 1^* \times Ld \times Id^* + \omega 1^* \times Ke \quad \text{(Equation 16)}$$

In the back EMF estimation and axis displacement calculation unit 57, axis displacement estimation value Δθ is calculated and output by the following function expression, from motor resistance setting value R, the electric constants Lq of the PM motor, which is output by the motor constant calculation unit 13, speed reference ω1*, detected electric currents Idc and Iqc, and voltage references Vd* and Vq*.

$$\Delta\theta = \tan^{-1} \frac{V_d^* - R \cdot I_{dc} + \omega 1 \cdot L_q \cdot I_{qc}}{V_q^* - R \cdot I_{qc} + \omega 1 \cdot L_q \cdot I_{dc}} \quad \text{(Equation 17)}$$

By using electric constants Ld, Lq and Ke of the PM motor, which are output by the motor constant calculation unit 13, in the above calculation, which is embodiment of the present invention, highly precise rotor position information can be acquired and high response control can be attained, even when electric constants of a motor vary with increase in motor electric current caused by high load or the like.

Embodiment 4

In embodiment 3, explanations was given on configuration of the case not having a position sensor and having an electric current sensor, however, configuration of the case having both a position sensorless and an electric current sensorless is also attainable. Explanation thereon will be given with reference to FIG. 11.

Figure 9:
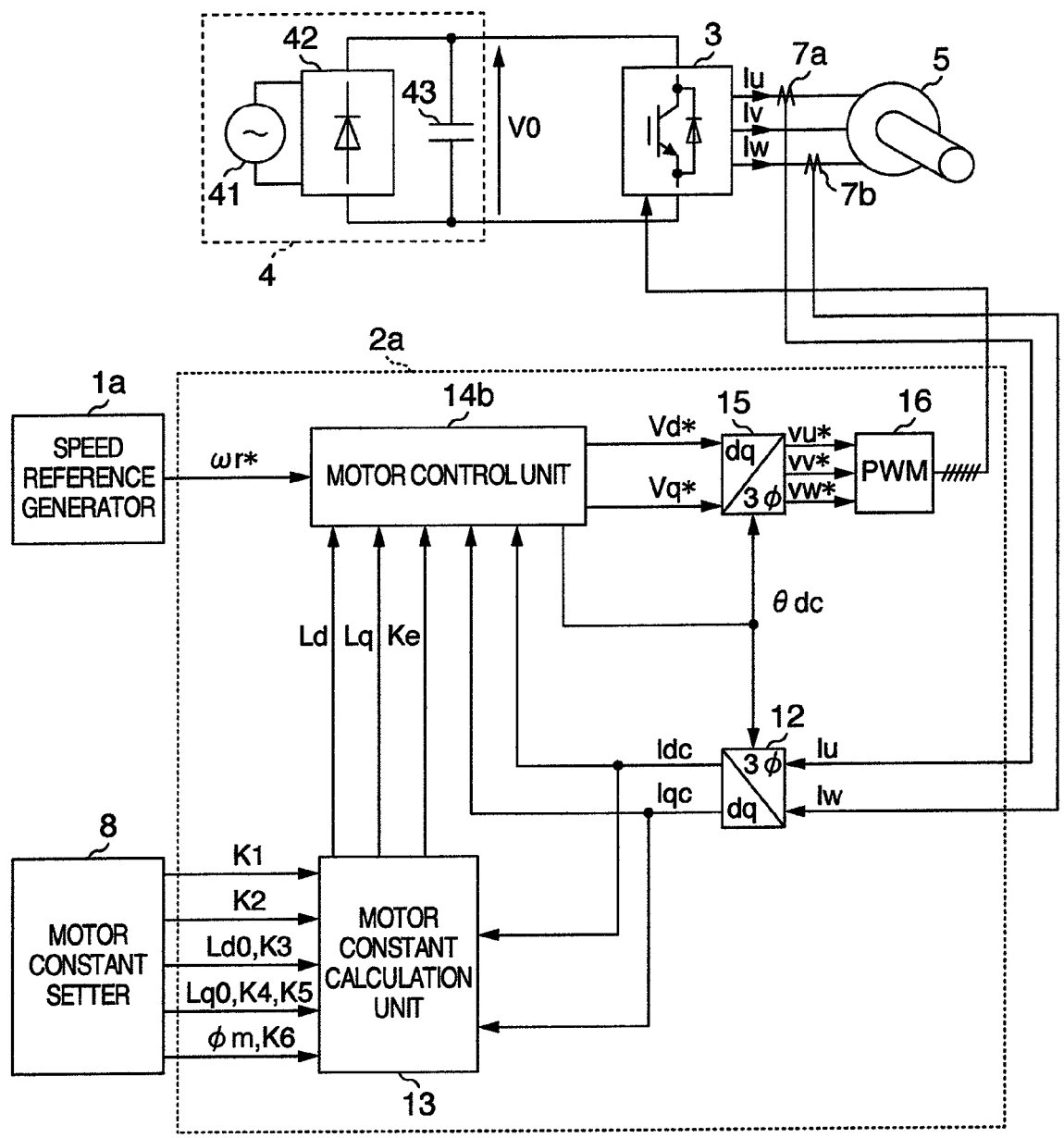
FIG. 9 is a block diagram showing a system configuration of embodiment 3 of the present invention.
Figure 11:
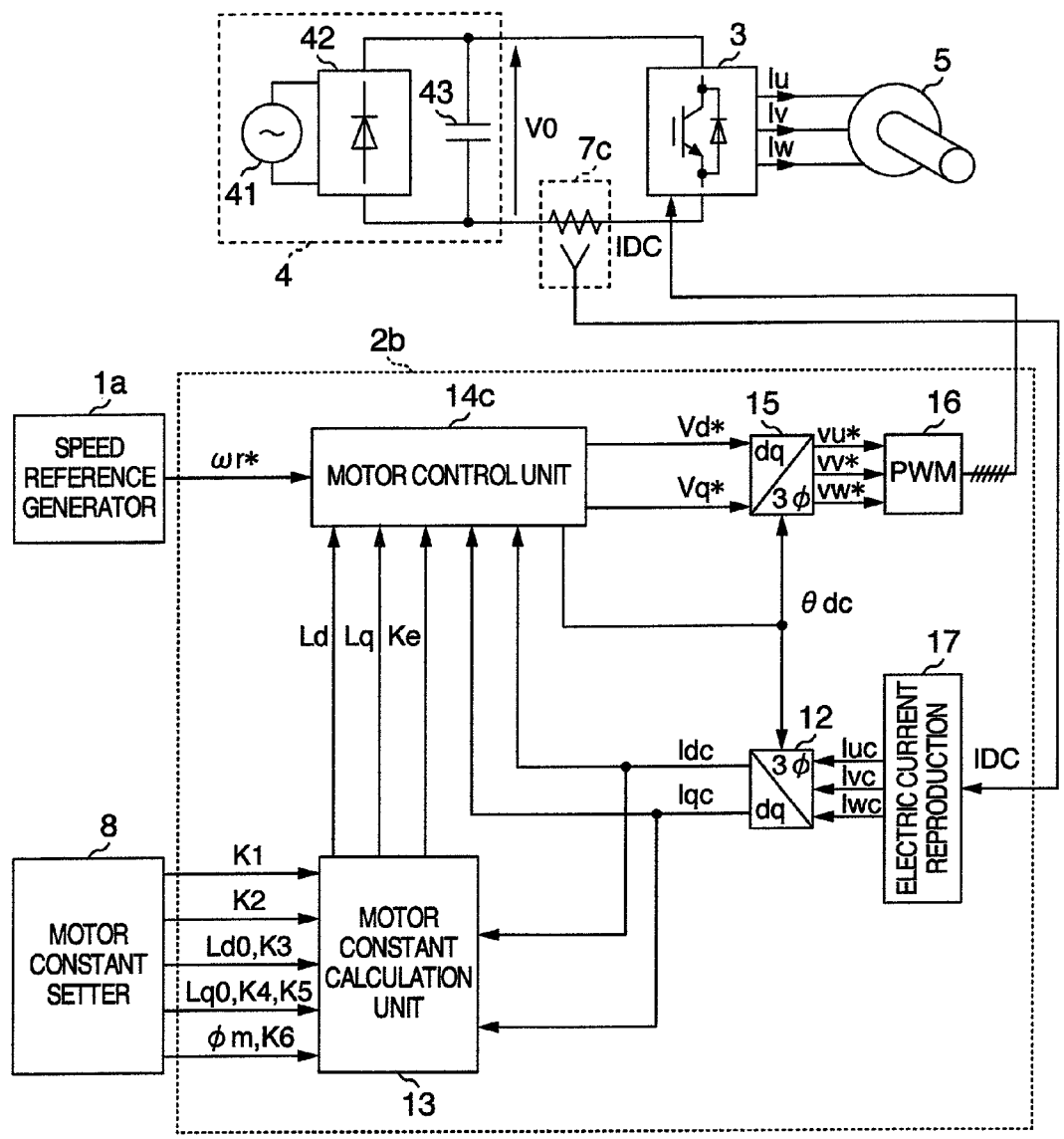
FIG. 11 is a block diagram showing a system configuration of embodiment 4 of the present invention.
Figure 12:
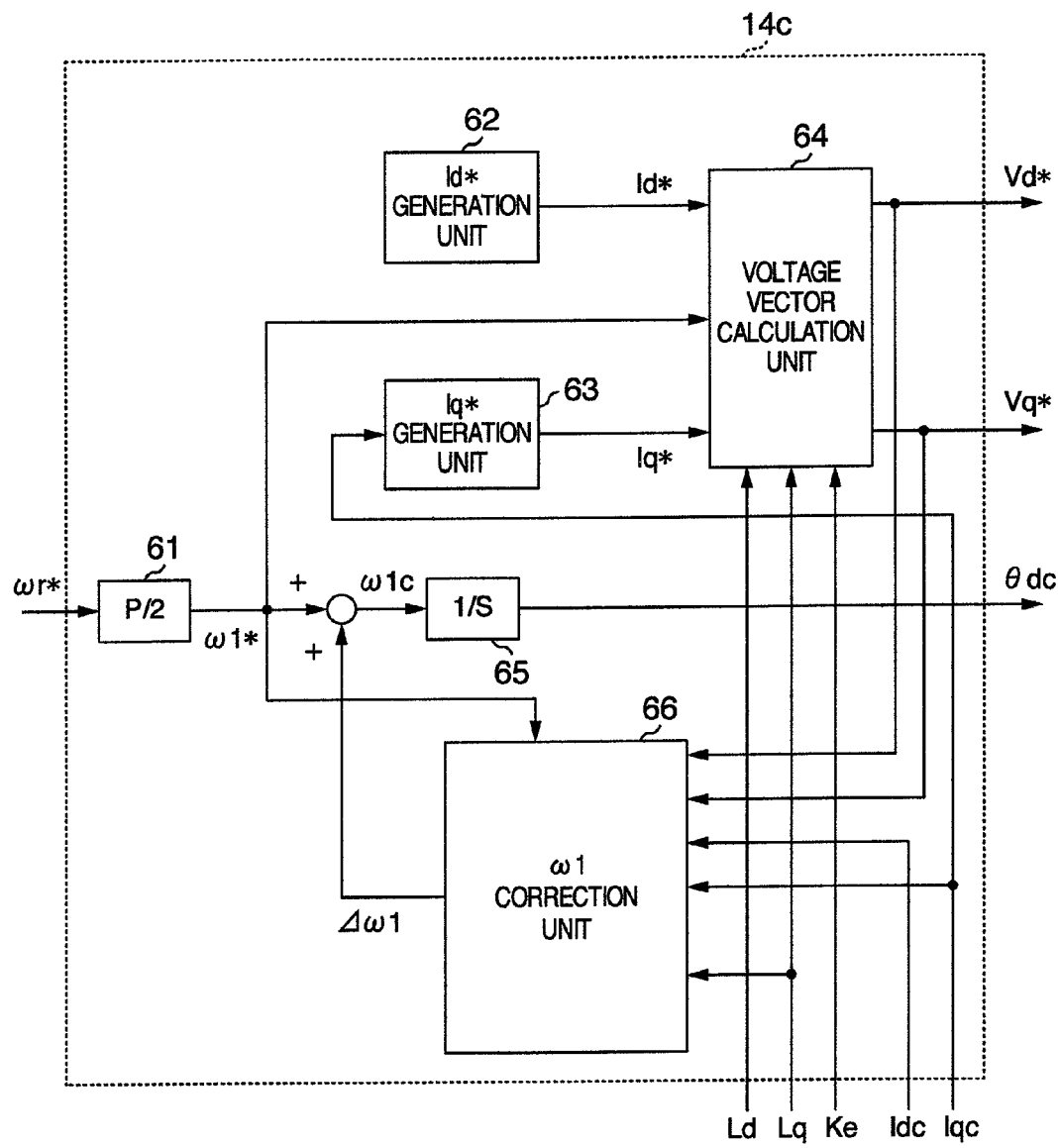
FIG. 12 is a block diagram showing an internal configuration of a motor control unit in embodiment 4 of the present invention.

Different points of FIG. 11 from FIG. 9 are as follows. Firstly, the electric current detector 7a for detecting electric current Iu, and the electric current detector 7b for detecting electric current Iw are eliminated, an electric current detector 7c is newly provided, and electric current IDC supplied to the inverter 3 by the DC power source 4 is detected. In addition, an electric current reproduction unit 17 is newly provided, and three-phase AC electric currents Iu, Iv and Iw flowing the PM motor 5, are calculated and reproduced by a method described in JP-A-8-19263 etc., based on power source electric current IDC detected by the electric current detector 7c. In addition, the motor control unit 14b is substituted with the motor control unit 14c.

As for a setting method for the electric constants, a method explained in embodiment 1 is used.

Configuration of the motor control unit 14c shown in the present embodiment is nearly the same as that of FIG. 1 of JP-A-2004-48868, and different points are that the electric constants Ld, Lq and Ke of the PM motor, which are output by the motor constant calculation unit 13, are input to a voltage vector calculation unit 64 and a ω1 correction unit 66, to be used in calculation of Vd*, Vq* and Δω1.

By using electric constants Ld, Lq and Ke of the PM motor, which are output by the motor constant calculation unit 13, in the above calculation, which is embodiment of the present invention, voltage reference and correction amount Δω1 can be calculated in high precision, and stable and high response control can be attained, even when electric constants of a motor vary with increase in motor electric current, caused by high load or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for an AC motor comprising:
   an inverter for applying pulse width modulated voltage to an AC motor, and for driving said AC motor;
   a unit for detecting electric current of said AC motor; and
   a controller for adjusting pulse width modulated voltage, which said inverter outputs, and for driving said AC motor;
   wherein said controller is provided with a motor constant calculation unit for calculating electric constants of a motor, and
   said motor constant calculation unit corrects setting values of electric constants defined on one of the axes of two orthogonal axes, by using a state variable defined on the same axis, and also corrects them by using a state variable defined on the other axis, and uses said corrected electric constants for driving control of said AC motor.

2. The control apparatus for the AC motor according to claim 1, wherein at least one of the correction of electric constants setting values by the state variable on said same axis, and the correction of electric constants setting values by the state variable on said other axis is corrected by a function expression using constants characterizing effects given on said electric constants by said state variable, with said state variable as a parameter.

3. The control apparatus for the AC motor according to claim 2, wherein said constants characterizing effects given on said electric constants by said state variable, with said state variable as a parameter, used in said function expression, is only one.

4. The control apparatus for the AC motor according to claim 1, wherein inductances are used as said electric constants.

5. The control apparatus for the AC motor according to claim 1, wherein back EMF constants are used as said electric constants.

6. The control apparatus for the AC motor according to claim 1, wherein electric current is used as said state variable.

7. The control apparatus for the AC motor according to claim 1, wherein when said electric constants setting values are assumed as back EMF constant Ke, and the back EMF constant at electric current with nearly zero is used as φm0, said motor constant calculation unit executes correction of Ke by q-axis electric current Iq, by using the equation of $Ke(Iq) = \phi m0 - K \times Iq \times Iq$, wherein K is a constant.

8. The control apparatus for the AC motor according to claim 1, wherein said controller is provided with a motor control unit, and
   said motor control unit calculates voltage reference, necessary in driving of said AC motor, based on drive reference, said state variable and said corrected electric constants.

9. The control apparatus for the AC motor according to claim 8, wherein said motor control unit is provided with a speed calculation unit for calculating rotation speed of said AC motor, a state variable reference calculation unit for calculating state variable reference of said AC motor, and a voltage vector calculation unit, and
   said voltage vector calculation unit calculates the voltage reference from said corrected electric constants, said state variable reference and said rotation speed.

10. The control apparatus for the AC motor according to claim 8, wherein said drive reference is assumed as torque reference of said AC motor,
    said motor control unit is provided with a torque calculation unit,
    said torque calculation unit calculates torque of said AC motor from said corrected electric constants and said state variable, and
    the state variable reference is calculated so that said calculated torque comes close to said torque reference.

11. The control apparatus for the AC motor according to claim 8, wherein said drive reference is assumed as rotation speed reference of said AC motor,
    said controller is provided with an back EMF estimation and calculation unit, and an axis displacement calculation unit, and
    said back EMF estimation and calculation unit and said axis displacement calculation unit estimate back EMF of said AC motor, based on said voltage reference, said state variable, said corrected electric constants and said rotation speed reference, and
    calculate a phase thereof from said estimated back EMF, and estimates rotator position of said AC motor.

12. The control apparatus for the AC motor according to claim 11, wherein said back EMF estimation and axis displacement calculation unit is provided with a control axis assuming a magnetic pole axis of the inside of said AC motor; and
    an axis displacement calculation unit for calculating axis displacement between said control axis and a practical magnetic pole axis of said AC motor, and
    calculates said axis displacement, from said state variable, said rotation speed reference, said voltage reference, and said corrected electric constants.

13. A control apparatus for an AC motor comprising:
    an inverter for applying pulse width modulated voltage to an AC motor, and for driving said AC motor;
    a unit for detecting electric current of said AC motor; and
    a controller for adjusting pulse width modulated voltage, which said inverter outputs, and for driving said AC motor;
    wherein said controller is provided with a motor constant calculation unit for calculating electric constants of a motor, and
    said motor constant calculation unit corrects setting values of electric constants defined on one of the axes of two orthogonal axes, by using a state variable defined on the same axis, and corrects them by using a state variable defined on the other axis, and uses said corrected electric constants for driving control of said AC motor,
    and when said electric constants setting values are used as d-axis inductance Ld, and said Ld corrected by using d-axis electric current Id is used as Ld(Id), said motor constant calculation unit executes correction of Ld by q-axis electric current Iq, by using the equation of $Ld(Id, Iq) = Ld(Id) - K \times Iq \times Iq$, wherein K is a constant.

14. A control apparatus for an AC motor comprising:
    an inverter for applying pulse width modulated voltage to an AC motor, and for driving said AC motor;
    a unit for detecting electric current of said AC motor; and a controller for adjusting pulse width modulated voltage, which said inverter outputs, and for driving said AC motor;

wherein said controller is provided with a motor constant calculation unit for calculating electric constants of a motor, and said motor constant calculation unit corrects setting values of electric constants defined on one of the axes of two orthogonal axes, by using a state variable defined on the same axis, and corrects them by using a state variable defined on the other axis, and uses said corrected electric constants for driving control of said AC motor and when said electric constants setting values are used as q-axis inductance Lq, and said Lq corrected by using q-axis electric current Iq is used as Lq(Iq), said motor constant calculation unit executes correction of Lq by d-axis electric current Id, by using the equation of Lq(Id, Iq)=Lq(Iq)−K×Id, wherein K is a constant.

* * * * *